(12) United States Patent  
Raynaud et al.

(10) Patent No.: US 8,935,016 B2  
(45) Date of Patent: Jan. 13, 2015

(54) METHOD AND DEVICE FOR AUTOMATICALLY MANAGING THE SPACING OF AT LEAST ONE FOLLOWING AIRCRAFT BEHIND AT LEAST ONE TARGET AIRCRAFT

(71) Applicant: Airbus Operations (SAS), Toulouse (FR)

(72) Inventors: Sylvain Raynaud, Cornebarrieu (FR); Jean-Christophe Guillermin, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 14/023,855

(22) Filed: Sep. 11, 2013

(65) Prior Publication Data

US 2014/0081482 A1 Mar. 20, 2014

(30) Foreign Application Priority Data

Sep. 11, 2012 (FR) ...................... 12 58501

(51) Int. Cl.
| | | |
|---|---|---|
| G05D 1/10 | (2006.01) | |
| G05D 1/12 | (2006.01) | |
| G08G 5/00 | (2006.01) | |
| G08G 9/02 | (2006.01) | |

(52) U.S. Cl.
CPC .................. G05D 1/104 (2013.01); G05D 1/12 (2013.01); G08G 5/00 (2013.01); G08G 5/0008 (2013.01); G08G 5/0021 (2013.01); G08G 5/0052 (2013.01); G08G 5/0078 (2013.01); G08G 9/02 (2013.01)
USPC .............................................. 701/3; 701/124

(58) Field of Classification Search
CPC ....................................................... G05D 1/104
USPC .......................................................... 701/121
See application file for complete search history.

(56) References Cited

U.S. PATENT DOCUMENTS

| | | | | |
|---|---|---|---|---|
| 6,072,571 | A * | 6/2000 | Houlberg | 356/139.04 |
| 6,172,747 | B1 * | 1/2001 | Houlberg | 356/139.04 |
| 6,718,236 | B1 * | 4/2004 | Hammer et al. | 701/3 |
| 6,950,037 | B1 * | 9/2005 | Clavier et al. | 340/945 |
| 7,248,963 | B2 * | 7/2007 | Baiada et al. | 701/120 |
| 7,385,527 | B1 * | 6/2008 | Clavier et al. | 340/945 |
| 7,412,324 | B1 * | 8/2008 | Bagge et al. | 701/120 |
| 7,433,779 | B2 * | 10/2008 | Deker et al. | 701/122 |

(Continued)

FOREIGN PATENT DOCUMENTS

| | | |
|---|---|---|
| FR | 2 925 710 | 6/2009 |
| FR | 2 926 156 | 7/2009 |
| WO | WO 2006/135916 | 12/2006 |

OTHER PUBLICATIONS

FR Search Report for 12 58501 dated May 2, 2013.

(Continued)

*Primary Examiner* — John R Olszewski  
*Assistant Examiner* — Mohsen Ghajargar  
(74) *Attorney, Agent, or Firm* — Nixon & Vanderhye P.C.

(57) ABSTRACT

The system (1) comprises means for determining the distance at the current time of the target aircraft (B) with respect to the merge waypoint (P0) along its path (TB), this distance being transmitted to calculation means in order to determine the speed control commands which are subsequently applied to the reference aircraft (A) in order for it to carry out the acquisition of the spacing at said merge waypoint (P0).

11 Claims, 2 Drawing Sheets

(56) References Cited

U.S. PATENT DOCUMENTS

| | | | |
|---|---|---|---|
| 2003/0050746 A1* | 3/2003 | Baiada et al. | 701/3 |
| 2007/0061055 A1 | 3/2007 | Stone et al. | |
| 2008/0103647 A1* | 5/2008 | Lucas et al. | 701/16 |
| 2008/0228333 A1* | 9/2008 | De Menorval et al. | 701/14 |
| 2009/0043434 A1* | 2/2009 | Deker | 701/16 |
| 2009/0177342 A1 | 7/2009 | Gutierrez-Castaneda | |
| 2010/0217510 A1* | 8/2010 | Deker | 701/120 |

OTHER PUBLICATIONS

Ivanescu et al., "A Pilot Decision Support Tool for Merging Behind a Lead Aircraft", Decision and Control, 2005 and 2005 European Control Conference, CDC-E CC '05, $44^{th}$ IEEE Conference on Seville, Spain, Dec. 2005, pp. 3964-3969.

Ivanescu et al, "Effect of Entry Conditions on Airbourne Spacing when Sequencing Multiple Converging Aircraft", AIAA Guidance, Navigation and Control Conference and Exhibit, Aug. 2003, pp. 1-8.

* cited by examiner

METHOD AND DEVICE FOR AUTOMATICALLY MANAGING THE SPACING OF AT LEAST ONE FOLLOWING AIRCRAFT BEHIND AT LEAST ONE TARGET AIRCRAFT

This application and claims priority to FR 12 58501 filed 11 Sep. 2012, the entire contents of which is hereby incorporated by reference.

BACKGROUND OF THE INVENTION

1. Field of the Invention

The present invention relates to a method and a system for automatic management of the spacing of at least one aircraft, referred to as reference aircraft, behind at least one other aircraft, referred to as target aircraft, preceding it.

2. Discussion of Prior Art

It is desirable, in order to maintain a spacing, to apply speed control commands to the reference aircraft (or following aircraft) such that they allow said reference aircraft to adopt the same position, the same speed, and the same acceleration as the target aircraft (or aircraft being followed) N seconds before the current time (or present time), N seconds corresponding to a predetermined period of time.

The present invention may be applied to a cruising phase, in particular to make a fleet of aircraft, for example cargo planes, fly behind one another. It may also be applied to a descent phase or an approach phase prior to landing, in particular on an airport runway.

With regard to such an approach, it is known that, due to the ever-increasing air traffic, new methods are being sought for avoiding saturation of the busiest airport platforms. One of these methods consists in delegating to an aircraft (following aircraft), in particular a cargo plane, the automatic performance of a spacing maneuver with respect to another aircraft (aircraft being followed) flying in front of it, within the terminal areas of the air traffic control. In order to implement such a method, an air traffic controller indicates to the following aircraft, by means of a usual radio communications system, which aircraft it must follow, the type of maneuver to be carried out, and the value of the spacing with which it must comply. The performance of such an automatic spacing maneuver allows the landing and take-off capacities of the runways of an airport to be increased, by optimizing the distances between the aircraft (during landing and during take-off).

From the document FR-2 925 711 (U.S. Pat. No. 8,108, 088), a method and a device are known for automatic guidance, during a landing procedure, of a following aircraft which follows a preceding aircraft, with a particular spacing according to a spacing maneuver. This method and this device allow spurious engine power applications to be avoided, by automatically controlling, during the whole spacing maneuver, the current energetic state of the following aircraft, in order for it to remain compatible with the execution of an approach procedure leading up to a landing (with, if necessary, a limitation in the guidance commands relating to the speed).

Furthermore, from the document FR-2 968 440 (U.S. Publication 2013/0261945), a system is known for automatic management of the spacing of a reference aircraft behind at least one target aircraft, which comprises a device for implementing an acquisition function allowing a given spacing between this reference aircraft and the target aircraft to be automatically acquired at a merge waypoint and a hold function which allows this spacing to be automatically maintained following its acquisition. This device comprises calculation means relating to said acquisition function which determine speed control commands which are applied to the reference aircraft in order for it to perform the acquisition of said spacing at said merge waypoint.

Such a device uses information relating to the distance of the target aircraft with respect to the merge waypoint for determining said speed control commands which are applied to the reference aircraft.

Four types of acquisition maneuvers are notably possible:

a following maneuver (referred to as "Remain Behind"): the two aircraft follow the same route, and the acquisition is to be carried out within a reasonable period of time (time constraint);

a convergence maneuver (referred to as "Merge then Remain Behind"): the two aircraft having a common flightplan after a merge waypoint (or convergence point), the acquisition must be carried out at the latest at this merge waypoint (spatial constraint). The target aircraft is presumed to fly directly toward the merge waypoint;

a heading away and convergence maneuver (referred to as "Vector then Merge Behind"): the reference aircraft (or following aircraft) initially following a given heading, a flight management system calculates a path heading away for this reference aircraft, followed by a convergence to a merge waypoint, where the acquisition is to be carried out at the latest at this merge waypoint. The target aircraft is assumed to fly directly toward the merge waypoint; and a hold and convergence maneuver (referred to as "Follow route then Merge Behind"): the reference aircraft following its scheduled route, a management system for the flight calculates a path comprising a direct segment toward the merge waypoint starting from a point which is correctly positioned along the flightplan in order to carry out the acquisition at said merge waypoint. The target aircraft is presumed to fly directly toward the merge waypoint In all of these maneuvers, it is assumed that the target aircraft flies directly toward the merge waypoint.

This assumption of direct flight (in other words following a rectilinear segment between the current position of the target aircraft and the position of the merge waypoint) does not however allow a correct and satisfactory acquisition of the spacing whenever the path of the target aircraft is significantly different from a direct path toward the merge waypoint.

Indeed, in such a situation, the target aircraft will take a significantly longer time to reach the merge waypoint than predicted.

Moreover, for flight paths having particularly complex geometries, the direct distance may even, over time, stop decreasing and locally re-increase. The effect on the guidance of the following aircraft may consist of an unnecessary acceleration at the start of the acquisition, followed by an abrupt deceleration at the end of the acquisition, which can lead to a degradation in comfort and potentially an incapacity to perform a correct acquisition resulting in a cancellation of the maneuver. As such a situation is not rare, it leads to a significant limitation of the possibility of using the usual acquisition function.

SUMMARY OF THE INVENTION

The aim of the present invention is to overcome the above drawback. It relates to a method designed to automatically manage the spacing of an aircraft, referred to as reference aircraft, behind at least one other aircraft, referred to as target aircraft, preceding it, said method allowing any type of acquisition to be managed (in a particularly efficient manner) and this can be done irrespective of the path followed by the target aircraft in the direction of the merge waypoint.

For this purpose, according to the invention, said method for automatic management of the spacing of an aircraft referred to as reference aircraft behind at least one other aircraft referred to as target aircraft, a method according to which an acquisition function is implemented which allows a given spacing between this reference aircraft and the target aircraft to be automatically acquired at a merge waypoint and a hold function is implemented which automatically allows this spacing to be automatically maintained after its acquisition, said acquisition function using the distance of the target aircraft with respect to the merge waypoint in order to determine the speed control commands which are applied to the reference aircraft in order for it to carry out the acquisition of said spacing at said merge waypoint, is noteworthy in that, onboard the reference aircraft:

a) a first distance value is received which is transmitted by an air traffic controller, said first distance value indicating the distance at a given moment in time, referred to as initial time, of the target aircraft with respect to the merge waypoint along its flightplan;
b) the current values of flight parameters of the target aircraft at the current time are received in an automatic and repetitive manner;
c) with the aid of said current values, the distance traveled by the target aircraft, starting from said initial time up to the current time, is calculated in an automatic and repetitive manner, this distance representing a second distance value;
d) said second distance value is subtracted in an automatic and repetitive manner from said first distance value in such a manner as to obtain an auxiliary distance; and
e) by means of this auxiliary distance, a remaining distance representing the distance at the current time of the target aircraft with respect to said merge waypoint is determined in an automatic and repetitive manner, this remaining distance being subsequently used for determining the speed control commands which are applied to the reference aircraft in order for it to carry out the acquisition of said spacing at said merge waypoint.

Thus, thanks to the invention, the (current) effective remaining distance of the target aircraft (or aircraft being followed) is determined in a repetitive manner with respect to the merge waypoint along its flightplan. This current effective remaining distance is subsequently used for calculating (in a usual manner) the speed control commands to be applied to the reference aircraft (or following aircraft) in order to carry out the acquisition.

Thus, by determining and by taking into account the current remaining distance that the target aircraft will effectively travel rather than a direct distance (which is approximate), speed control commands are able to be calculated which are adapted to the real situation (namely to the flight effectively carried out by the target aircraft toward the merge waypoint) in such a manner as to be able to perform an acquisition exactly at said merge waypoint, without having the problems of variation of acceleration and of discomfort that may occur where a direct distance is taken into account. This allows the aforementioned drawbacks to be overcome.

An accurate, or at the very least satisfactory, guidance is thus obtained even when the flightplan of the target aircraft exhibits a very complex geometry, and very different from a direct flight.

In the framework of the present invention, in order to determine the current remaining distance, the distance (from the target aircraft to the merge waypoint along its flightplan) at a given moment in time (referred to as initial time in the present description) is used, which distance is transmitted by the air traffic controller to the reference aircraft.

The air traffic controller determines this distance in the usual manner. He/she subsequently transmits it to the pilot, either by voice or via a data transmission link.

The main advantage of this feature (information communicated by the air traffic controller) is that this information is accurate even in the case where the target aircraft does not follow its flightplan and is guided by the air traffic controller.

In a first embodiment, at the step a), an operator inputs said first distance value, which he has received from the air traffic controller, by means of usual input means (control ball, track ball, keyboard, etc.).

Furthermore, in a second embodiment, at the step a), said first value, which is received from said air traffic controller via a data transmission link, is automatically input, after validation by an operator, which notably allows the workload of the operator to be reduced.

In the framework of the present invention, various methods for calculating the second distance value may be implemented at the step c).

In a first simplified variant embodiment, advantageously, at the step c), said second distance value $d2A(t)$ at the current time is calculated by means of the following expression:

$$d2A(t) = \int_{t0}^{t} v(t) dt$$

in which:
  t0 is said initial time;
  t is the current time; and
  v(t) is the speed of the target aircraft (at the time t), received at the step b).

Furthermore, in a second variant embodiment, advantageously, at the step c), said second distance value $d2B(t)$ at the current time is calculated by means of the following expression:

$$d2B(t) = \int_{t0}^{t} \sqrt[2]{(\Delta x(t))^2 + (\Delta y(t))^2}\, dt$$

in which:
  $\Delta x$ is the variation of a first coordinate of the aircraft in the lateral plane between two successive positions, received at the step b); and
  $\Delta y$ is the variation of a second coordinate of the aircraft in the lateral plane between two successive positions, received at the step b).

This second variant embodiment allows the effect of the wind and of the temperature to be taken into account, and the CAS/TAS conversion is better taken into account, CAS (for "Calibrated Air Speed") being the corrected speed (in other words the speed indicated on the anemometer, corrected for the position errors and for the instrument errors) and TAS (for "True Air Speed") being the real speed (in other words the speed of the aircraft with respect to the unperturbed air).

Furthermore, in a first simplified embodiment, said remaining distance (representing the distance at the current time of the target aircraft with respect to the merge waypoint) corresponds to said auxiliary distance calculated at the step d).

Furthermore, in a second preferred embodiment, advantageously, at the step e), said remaining distance D(t) at the current time is calculated by means of the following expression:

$$D(t)=K1(D)\cdot D1+K2(D)\cdot D2$$

in which:

D1 is said auxiliary distance calculated at the step d);

D2 is a current direct distance, representing the direct distance between the target aircraft and the merge waypoint, which is calculated;

K1 and K2 are two weighting factors which vary as a function of the remaining distance (and depend either on the remaining distance D calculated at the preceding calculation, or on the direct distance), K1 and K2 being such that:

$$K1+K2=1;$$

at the initial time, K1=1; and at the moment when the target aircraft reaches said merge waypoint, K2=1.

The variation of the weighting factors K1 and K2 may be linear or more complex (exponential or polynomial). This preferred embodiment allows the fact to be taken into account that:

the distance D1 is very precise near to the initial distance (first distance value), but its precision decreases at the approach to the merge waypoint; and the precision of the direct distance D2 increases with the approach to the merge waypoint.

In this preferred embodiment, said current direct distance D2 is calculated using the position of said merge waypoint and the current position of the target aircraft, received at the step b).

The present invention also relates to a system for automatic management of the spacing of at least one reference aircraft behind at least one target aircraft.

According to the invention, this system which is installed onboard the reference aircraft and which comprises at least one device for implementing an acquisition function that allows a given spacing between this reference aircraft and the target aircraft to be automatically acquired at a merge waypoint and a hold function that allows this spacing to be automatically maintained after its acquisition, said device comprising calculation means relating to said acquisition function which use the distance of the target aircraft with respect to the merge waypoint for determining the speed control commands which are applied to the reference aircraft in order for it to carry out the acquisition of said spacing at said merge waypoint, is noteworthy in that said device comprises:

firsts means for receiving a first distance value which is supplied by an air traffic controller, said first distance value indicating the distance at a given moment in time, referred to as initial time, of the target aircraft with respect to the merge waypoint along its flightplan;

second means for receiving, in an automatic and repetitive manner, the current values of flight parameters of the target aircraft;

thirds means for calculating, in an automatic and repetitive manner, with the aid of said current values, the distance traveled by the target aircraft starting from said initial time up to the current time, this distance representing a second distance value;

fourth means for subtracting, in an automatic and repetitive manner, said second distance value from said first distance value in such a manner as to obtain an auxiliary distance; and fifth means for determining, in an automatic and repetitive manner, by means of this auxiliary distance, a remaining distance representing the distance at the current time of the target aircraft with respect to the merge waypoint, said remaining distance being transmitted to said calculation means in order to determine the speed control commands which are subsequently applied to the reference aircraft in order for it to carry out the acquisition of said spacing at said merge waypoint.

Furthermore, in one particular embodiment, said automatic management system additionally comprises:

means for inputting into said device said first distance value which is supplied by an air traffic controller; and/or means for receiving onboard the reference aircraft the current values of flight parameters of the target aircraft, and means for inputting them into said device.

Furthermore, in one simplified embodiment, said fifth means determine, as the remaining distance, said auxiliary distance.

Furthermore, in one preferred embodiment, said fifth means comprise:

means for calculating a current direct distance, using the position of said merge waypoint and the current position of the target aircraft; and means for calculating said remaining distance at the current time, with the aid of said auxiliary distance and of said current direct distance.

The present invention relates to also an aircraft, in particular a cargo plane, which is equipped with an automatic management system, such as the aforementioned system.

BRIEF DESCRIPTION OF THE DRAWINGS

The figures of the appended drawing will make it clearly understood how the invention can be implemented. In these figures, identical references denote similar elements.

DETAILED DISCUSSION OF EMBODIMENTS

Figure 1:
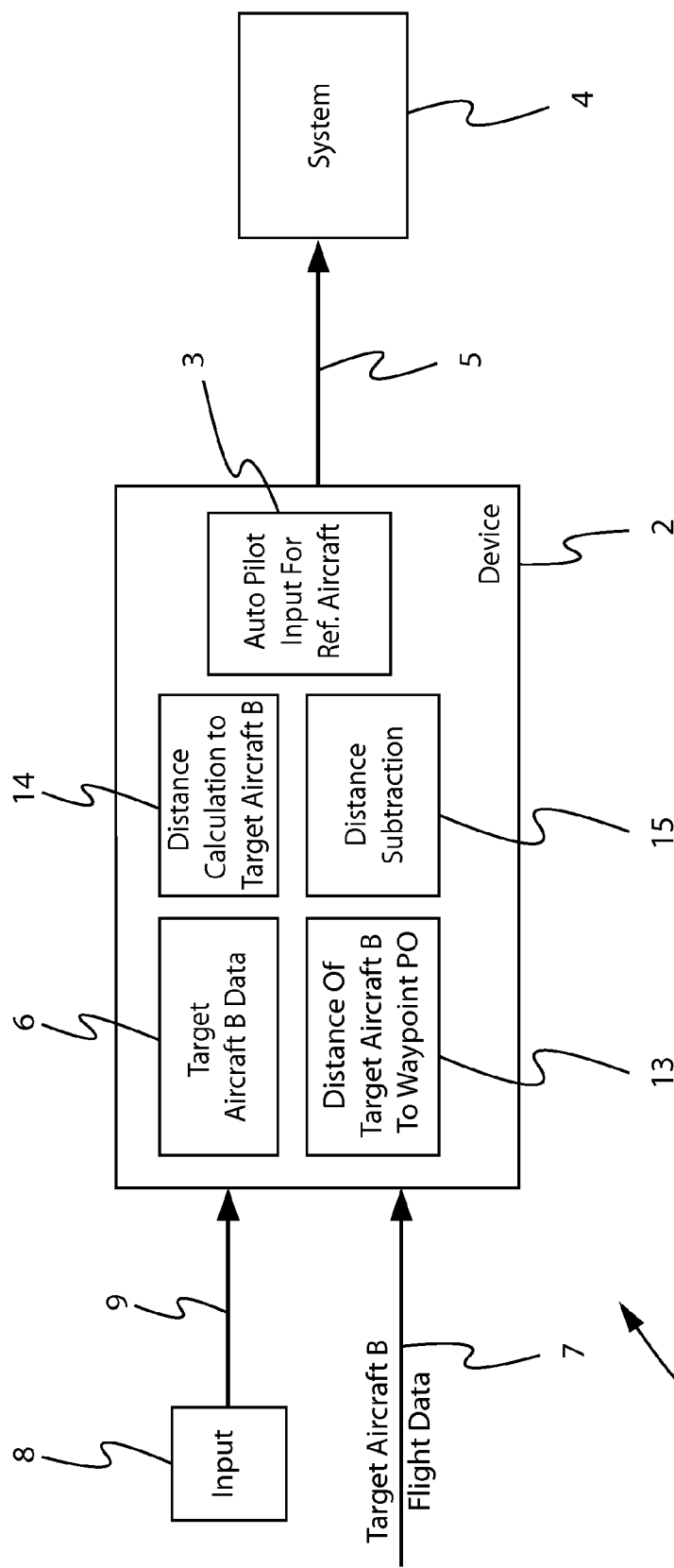
FIG. 1 is the schematic block diagram of a system according to the invention.

The system 1 according to the invention shown schematically in FIG. 1 is designed to automatically manage, in flight, the spacing of an aircraft A, referred to as reference aircraft (or following aircraft), with respect to at least one other aircraft B, referred to as target aircraft (or aircraft being followed), preceding it. This automatic management system 1 which is installed onboard the reference aircraft A, in particular a cargo plane, civilian or military, is notably designed to guide the latter in order for it to follow with a particular spacing.

For this purpose, said system 1 comprises a device 2 and a system 4 described hereinabove, which allow a main function to be implemented automatically. This main function comprises an acquisition function and a hold function which allow a spacing between the reference aircraft A and the target aircraft B, for example also a civilian or military cargo plane, to be acquired and to be automatically maintained.

More precisely, said device 2 comprises usual means 3 designed to automatically determine speed control commands which are subsequently transmitted (via a link 5) to an automatic pilot system 4 which automatically applies them, in the usual manner, to the reference aircraft A. It may also be envisioned for these speed control commands (calculated by the means 3) to be used on a display designed to assist the pilot when manually piloting the reference aircraft A.

More precisely, said device 2 is designed to automatically determine speed control commands which allow:

if this is not yet the case, a particular time separation T of N seconds to be acquired, which separation is required by the spacing maneuver; and as soon as this acquisition has been carried out, allow this particular time separation T to be maintained. The speed control commands are then such that they allow the reference aircraft A (or following aircraft) to have the same position, the same speed and the same acceleration as the target aircraft B (or aircraft being followed) had N seconds before the current time (or present time), N seconds corresponding to said time separation T.

Figure 2A:
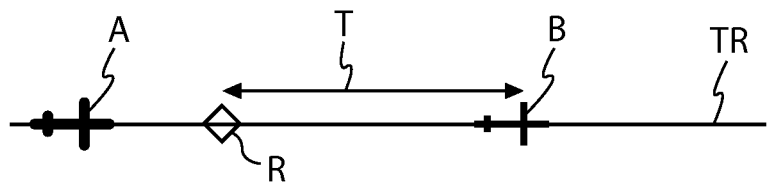
FIGS. 2A, 2B and 2C illustrate schematically various successive time points of a procedure for acquisition of a spacing.
Figure 2B:
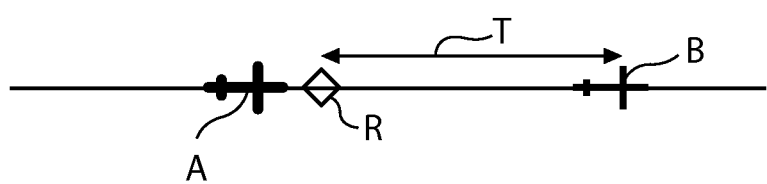
Figure 2C:
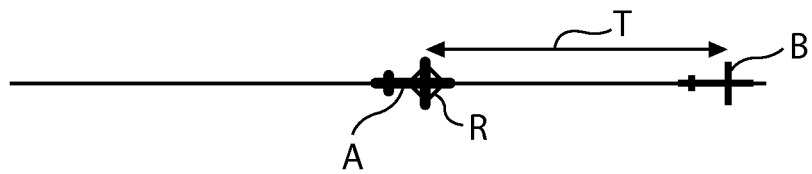

In FIGS. 2A, 2B and 2C, various successive time points are shown of a procedure for acquisition of a time separation T, by the reference aircraft A with respect to the target aircraft B (along a path TR). These successive time points are separated by the same period of time. In order to perform the acquisition, the reference aircraft A must be located, at the current time, at a reference point R (which is mobile and illustrates a reference aircraft), to within a predetermined margin of error. The reference aircraft R corresponds to a virtual aircraft that has the same position, the same speed and the same acceleration as the target aircraft B had N seconds (time period T) before the present time. This reference aircraft R is therefore used as a basis for the speed control. The acquisition is carried out in the situation in FIG. 2C. Once the acquisition has been carried out, the system 1 implements a procedure for maintaining the acquired time separation T.

Four types of acquisition maneuvers are, notably, possible:

a following maneuver ("Remain Behind"): the two aircraft A and B initially have the same horizontal flightplan, and the acquisition has to be carried out within a reasonable period of time (time constraint);

a convergence maneuver ("Merge then Remain Behind"): the two aircraft A and B have a common flightplan after a merge waypoint (or convergence point), the acquisition must be carried out at this merge waypoint at the latest (spatial constraint);

a heading away and convergence maneuver ("Vector then Merge Behind"): a flight management system of the reference aircraft A calculates a path heading away for this reference aircraft A (or following aircraft) followed by a convergence to a merge waypoint, where the acquisition must be carried out at the latest at this merge waypoint; and a hold and convergence maneuver ("Follow route then Merge Behind"): the reference aircraft A following its planned route, a management system for the flight calculates a path comprising a direct segment toward the merge waypoint starting from a point which is correctly positioned along the flightplan, so as to carry out the acquisition at said merge waypoint.

The device 2 also comprises:

means 6 that take into account the real successive current values of flight parameters (position, speed) of the target aircraft B (at successive time points), which are received from usual means (not shown), notably means for transmission of digital data, in particular of the ADS-B ("Automatic Dependent Surveillance-Broadcast") type, as illustrated by a link 7 (notably a usual data transmission link); and means 8 which allow an operator to input data into the device 2 via a link 9.

One embodiment of the system 1 allowing the usual functions to be implemented is described in the document FR-2 968 440 and is not discussed further in the present description.

With regard to the procedure provided, the crew, and notably the pilot of the reference aircraft A, carry out in particular:

the selection of the aircraft to be followed (target aircraft B), generally upon instruction from the air traffic controller via means (not shown and which are for example associated with the data transmission link 7), notably a system of the ATSAW ("Aircraft Traffic Situational Awareness") type;

the reception of an instruction to follow the target aircraft B;

the selection of the maneuver to be performed and the input of the parameters of the function (spacing requested, heading, etc.), using the means 8, for example a display and multifunction control system of the MCDU ("Multi-function Control and Display Unit") type; and the engagement of the maneuver.

Furthermore, in one particular embodiment (not shown), said system 1 may also comprise means which are formed in such a manner as to automatically engage the acquisition and hold function, if particular conditions are met.

As indicated hereinabove, in the usual systems for management of the spacing it is assumed that the target aircraft B flies directly toward the merge waypoint P0, namely along the direct path T0 in the example in FIG. 3. This assumption of direct flight (in other words following a rectilinear segment between the current position of the target aircraft B and the position of the merge waypoint P0) does not however allow a correct and satisfactory acquisition of the spacing whenever the path TB of the target aircraft B is significantly different from a direct path T0 toward said merge waypoint P0.

Figure 3:
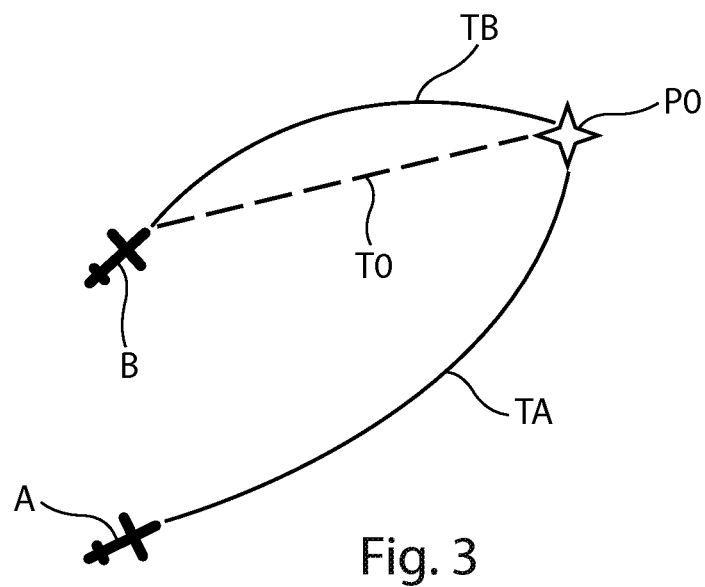
FIG. 3 illustrates schematically one phase of acquisition of a spacing between two aircraft.

In this FIG. 3 (illustrating a view in the lateral plane), in addition to the path TB effectively followed by the target aircraft B toward the merge waypoint P0 and to the direct path T0, the path TA effectively followed by the reference aircraft A (toward said merge waypoint P0) is also shown.

The object of the system 1 according to the present invention is to manage (in a particularly efficient manner) any type of acquisition and to do this irrespective of the path actually followed by the target aircraft B in the direction of the merge waypoint P0.

For this purpose, according to the invention, said device 2 comprises:

means 13 for receiving a first distance value d0 which is supplied by an air traffic controller, said first distance value d0 indicating the distance at a given moment in time, referred to as initial time (t0), of the target aircraft B with respect to the merge waypoint P0 along its flightplan (path TB);

said means 6 for receiving, in an automatic and repetitive manner, the current values of flight parameters of the target aircraft B, via the liaison 7;

means 14 for calculating, in an automatic and repetitive manner, with the aid of said current values, the distance traveled by the target aircraft B starting from said initial time t0 up to the current time, this distance representing a second distance value d2; and means 15 for subtracting, in an automatic and repetitive manner, said second distance value d2 from said first distance value d0 in such a manner as to obtain an auxiliary distance D1 (D1=d0−d2), and for determining, in an automatic and repetitive manner, by means of this auxiliary distance D1, a remaining distance D representing the distance at the current time of the target aircraft B with respect to the merge waypoint P0. The remaining distance D calculated by these means 15 is subsequently transmitted to said calculation means 3 in order to determine the speed control commands which are applied to the reference aircraft A in order for it to carry out the acquisition of said spacing at said merge waypoint P0.

Thus, the distance D used by the means 3 for calculating the speed control commands is the exact distance that will be traveled by the target aircraft B even if the latter does not fly directly toward the merge waypoint P0, as in the example in FIG. 3.

The processing steps implemented by the means 14 and 15 are carried out in a repetitive manner each time new current values of the flight parameters of the target aircraft B are received, and this is done using the same value d0.

Thus, by determining and by taking into account the current remaining distance D that the target aircraft B will effectively travel rather than a direct distance D2 (which may be approximate), the device 2 is capable of calculating speed control commands which are adapted to the real situation (namely to the flight effectively carried out by the target aircraft B toward the merge waypoint P0) in such a manner as to be able to carry out an acquisition exactly at said merge waypoint P0, without having the problems of variation of acceleration and of discomfort that may occur when a direct distance is taken into account.

A precise, or at the very least satisfactory, guidance is thus obtained even when the flightplan of the target aircraft B exhibits a very complex geometry, and very different from a direct flight.

In the framework of the present invention, in order to determine the current remaining distance, the device 2 therefore uses the distance d0 (from the target aircraft B to the merge waypoint P0 along its flightplan) at a given moment in time t0 (referred to as initial time in the present description), which is transmitted by the air traffic controller to the reference aircraft A.

The air traffic controller determines this distance d0 in the usual manner. He/she subsequently transmits it to the pilot either by voice, or via a data transmission link.

The main advantage of this feature (information communicated by the air traffic controller) is that this information is accurate even in the case where the target aircraft B does not following its flightplan and is guided by the air traffic controller.

In a first embodiment, an operator inputs said value d0, which he has received from said air traffic controller, by means of usual input means (control ball, track ball, keyboard, etc.), forming for example a part of the means 8.

Furthermore, in a second embodiment, said value d0, which is received from said air traffic controller via a data transmission link, is input automatically into the device 2 (for example via the link 7) after validation by an operator, which notably allows the workload of the operator to be reduced.

In the framework of the present invention, the means 14 may implement various methods for calculating said second distance value d2.

In a first variant embodiment, said means 14 comprise integrated elements (not shown) for calculating said second distance value d2A(t) at the current time, by means of the following expression:

$$d2A(t) = \int_{t0}^{t} v(t)dt$$

in which:
t0 is said initial time;
t is the current time; and v(t) is the speed of the target aircraft B, received via the link 7.

Furthermore, in a second variant embodiment, said means 14 comprise elements (integrated and not shown) for calculating said second distance value d2B(t) at the current time, by means of the following expression:

$$d2B(t) = \int_{t0}^{t} \sqrt[2]{(\Delta x(t))^2 + (\Delta y(t))^2} \, dt$$

in which:
Δx is the variation of a first coordinate of the target aircraft B in the lateral plane between two successive positions, received via the link 7; and
Δy is the variation of a second coordinate of the target aircraft B in the lateral plane between two successive positions, received via the link 7.

Δx(t) and Δy(t), representing the variation between two positions as a function of time, have the dimension of a speed.

This second variant embodiment allows the effect of the wind and of the temperature to be taken into account, and the CAS/TAS conversion is better taken into account.

Furthermore, in a first simplified embodiment, said means 15 use as the remaining distance D (representing the distance at the current time of the target aircraft B with respect to the merge waypoint P0) said auxiliary distance D1 that they have calculated, notably with D1=d0−d2A or D1=d0−d2B.

Furthermore, in one preferred embodiment, said means 15 comprise:

first integrated elements (not shown) for calculating a current direct distance D2, based on the position of said merge waypoint P0 and from the current position of the target aircraft B; and second integrated elements (not shown) for calculating said remaining distance D at the current time, by means of the auxiliary distance D1 and of said current direct distance D2.

More precisely, said second elements calculate said remaining distance D(t) at the current time, by means of the following expression:

$$D(t) = K1(D) \cdot D1 + K2(D) \cdot D2$$

in which:
D1 is therefore said auxiliary distance calculated by the means 15;
D2 is therefore said current direct distance, representing the direct distance between the target aircraft B and the merge waypoint P0, which is calculated by said first elements; and
K1 and K2 are two weighting factors.

The weighting factors K1 and K2 vary as a function of the remaining distance and depend either on the remaining distance D calculated at the preceding calculation step, or on the direct distance D2. In addition, K1 and K2 are such that:

$$K1+K2=1;$$

at the initial time, K1=1; and
at the time when the target aircraft B reaches said merge waypoint P0, K2=1.

The variation of the weighting factors K1 and K2 may be linear or more complex (exponential or polynomial). This preferred embodiment allows the fact to be taken into account that:

the distance D1 is very precise near to the initial distance d0, but its precision decreases as the merge waypoint P0 is approached. Indeed, the more time that passes, the less precise will be the value calculated from the position d0, since it is based on a value further away; and the precision of the direct distance D2 increases as the merge position P0 is approached. Moreover, the direct distance is always the true distance near to the merge waypoint P0.

As a consequence, far from the merge waypoint P0 and at the reset point for the distance d0, confidence in the value d0 just input is very high and confidence in the direct distance D2 is low, whereas, in the final nautical miles, the direct distance D2 becomes more and more accurate.

Of course, during the procedure for calculating D(t) on the basis of a value d0, it is possible to input into the device 2 a new value d0 (in the manner described previously), and the calculation is then performed by the device 2 on the basis of this new value.

This can be the case when the air traffic controller sends an updated distance d0, between the position of the target aircraft B and the merge waypoint P0, at a given moment in time (which will be the new initial time).

According to the invention, the calculation means, notably said means 14 and 15 (or said device 2) which perform the calculation of the distance D, may be integrated into units or systems already existing on the aircraft, and in particular, into a flight management system, a communications system, a traffic computer, a display system, or they may be arranged within a dedicated system.

The invention claimed is:

1. A method for automatic management of the spacing of an aircraft (A) referred to as reference aircraft behind at least one other aircraft (B) referred to as target aircraft, the method includes an acquisition function which allows a given spacing between this reference aircraft (A) and the target aircraft (B) to be automatically acquired at a merge waypoint (P0) and a hold function which allows this given spacing to be automatically maintained after its acquisition, said acquisition function using the distance of the target aircraft (B) with respect to the merge waypoint (P0) in order to determine the speed control commands which are applied to the reference aircraft (A) in order for it to carry out the acquisition of said spacing at said merge waypoint (P0), the method comprising the steps of:
   a) receiving on the reference aircraft (A) a first distance value transmitted by an air traffic controller, said first distance value indicating the distance at a given moment in time, referred to as initial time, of the target aircraft (B) with respect to the merge waypoint (P0) along a flightplan of target aircraft (B);
   b) receiving the current values of flight parameters of the target aircraft (B) at the current time in an automatic and repetitive manner;
   c) calculating, with the aid of said current values, the distance travelled by the target aircraft (B) starting from said initial time up to the current time in an automatic and repetitive manner, wherein said distance travelled by the target aircraft (B) representing a second distance value;
   d) subtracting said second distance value, in an automatic and repetitive manner, from said first distance value to obtain an auxiliary distance; and
   e) determining, in an automatic and repetitive manner, by means of the auxiliary distance, a remaining distance D(t) representing the distance at the current time of the target aircraft (B) with respect to said merge waypoint (P0) and determining the speed control commands which are applied to the reference aircraft (A) in order for reference aircraft (A) to carry out the acquisition of said spacing at said merge waypoint (P0), wherein, in step e), said remaining distance D(t) at the current time is calculated by means of the following expression:

$$D(t) = K1(D) \cdot D1 + K2(D) \cdot D2 \text{ in which:}$$

D1 is the auxiliary distance calculated at the step d);
D2 is a current direct distance, representing the direct distance between the target aircraft (B) and the merge waypoint (P0), which is calculated;
K1 and K2 are two weighting factors which vary as a function of the remaining distance and which are such that:

$$K1 + K2 = 1;$$

at the initial time, K1=1; and
at the moment time when the target aircraft (B) reaches said merge waypoint (P0), K2=1.

2. The method as claimed in claim 1, wherein, in step a), an operator inputs said first distance value, which he has received from said air traffic controller, by means of input means.

3. The method as claimed in claim 1, wherein, in step a), said first distance value, which is received from said air traffic controller via a data transmission link, is automatically input after validation by an operator.

4. The method as claimed in claim 1, wherein, at the step c), said second distance value d2A(t) at the current time is calculated by means of the following expression:

$$d2A(t) = \int_{t0}^{t} v(t) dt \text{\_in which:}$$

t0 is said initial time;
t is the current time; and
v(t) is the speed of the target aircraft (B), received at the step b).

5. The method as claimed in claim 1, wherein, at the step c), said second distance value d2B(t) at the current time is calculated by means of the following expression:

$$d2B(t) = \int_{t0}^{t} \sqrt[2]{(\Delta x(t))^2 + (\Delta y(t))^2} \, dt \text{\_in which:}$$

t0 is said initial time;
t is the current time;
Δx is the variation of a first coordinate of the target aircraft (B) in the lateral plane between two successive positions, received at the step b); and
Δy is the variation of a second coordinate of the target aircraft (B) in the lateral plane between two successive positions, received at the step b).

6. The method as claimed in claim 1, including the step of calculating said current direct distance using the position of said merge waypoint (P0) and the current position of the target aircraft (B), received at the step b).

7. A system for automatic management of the spacing of an aircraft (A) referred to as reference aircraft behind at least one other aircraft (B) referred to as target aircraft, said system installed onboard the reference aircraft (A) and comprising at least one device for implementing an acquisition function which allows a given spacing between reference aircraft (A) and target aircraft (B) to be automatically acquired at a merge waypoint (P0) and a hold function which allows said given spacing to be automatically maintained after its acquisition, said device comprising:

calculation means, relating to said acquisition function using the distance of the target aircraft (B) with respect to the merge waypoint (PO), for determining the speed control commands which are applied to the reference aircraft (A) in order for the reference aircraft to carry out the acquisition of said spacing at said merge waypoint (P0), first means for receiving a first distance value supplied by an air traffic controller, said first distance value indicating the distance at a given moment in time, referred to as initial time, of the target aircraft (B) with respect to the merge waypoint (P0) along said target aircraft flight-plan;

second means for receiving, in an automatic and repetitive manner, the current values of flight parameters of the target aircraft (B);

third means for calculating, in an automatic and repetitive manner, with the aid of said current values, the distance travelled by the target aircraft (B) starting from said initial time up to the current time, this distance representing a second distance value;

fourth means for subtracting, in an automatic and repetitive manner, said second distance value from said first distance value to obtain an auxiliary distance; and fifth means for determining, as the remaining distance, said auxiliary distance said remaining distance representing the distance at the current time of the target aircraft (B) with respect to the merge waypoint (P0), and for transmitting said remaining distance to said calculation means for determining the speed control commands which are subsequently applied to the reference aircraft (A) in order for the reference aircraft (A) to carry out the acquisition of said spacing at said merge waypoint (P0).

8. The system as claimed in claim 7, wherein it comprises, in addition, means for inputting into said device said first distance value which is supplied by an air traffic controller.

9. The system as claimed in claim 7, wherein it additionally comprises means for receiving onboard the reference aircraft the current values of flight parameters of the target aircraft (B), and means for inputting them into said device.

10. The system as claimed in claim 7, wherein said fifth means comprise:
   means for calculating a current direct distance, using the position of said merge waypoint (P0) and the current position of the target aircraft (B); and
   means for calculating said remaining distance at the current time, by means of said auxiliary distance and of said current direct distance.

11. An aircraft, wherein said aircraft comprises a system for automatic management of the spacing of an aircraft (A) referred to as reference aircraft behind at least one other aircraft (B) referred to as target aircraft, as set out in claim 7.

* * * * *